March 14, 1950  A. R. STARR  2,500,212
RADIO CONTROL SYSTEM
Filed Dec. 18, 1944  3 Sheets-Sheet 1
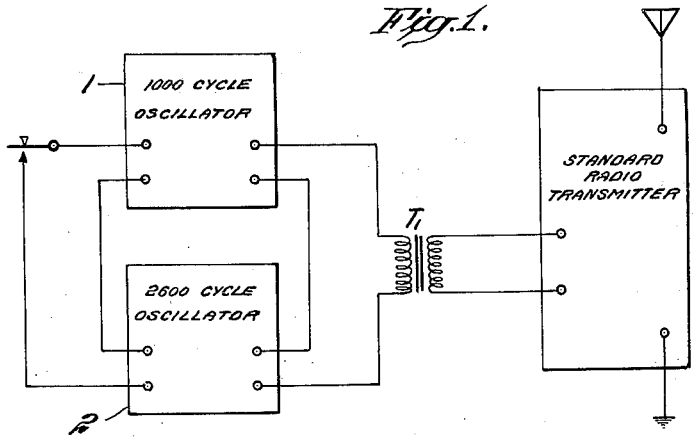
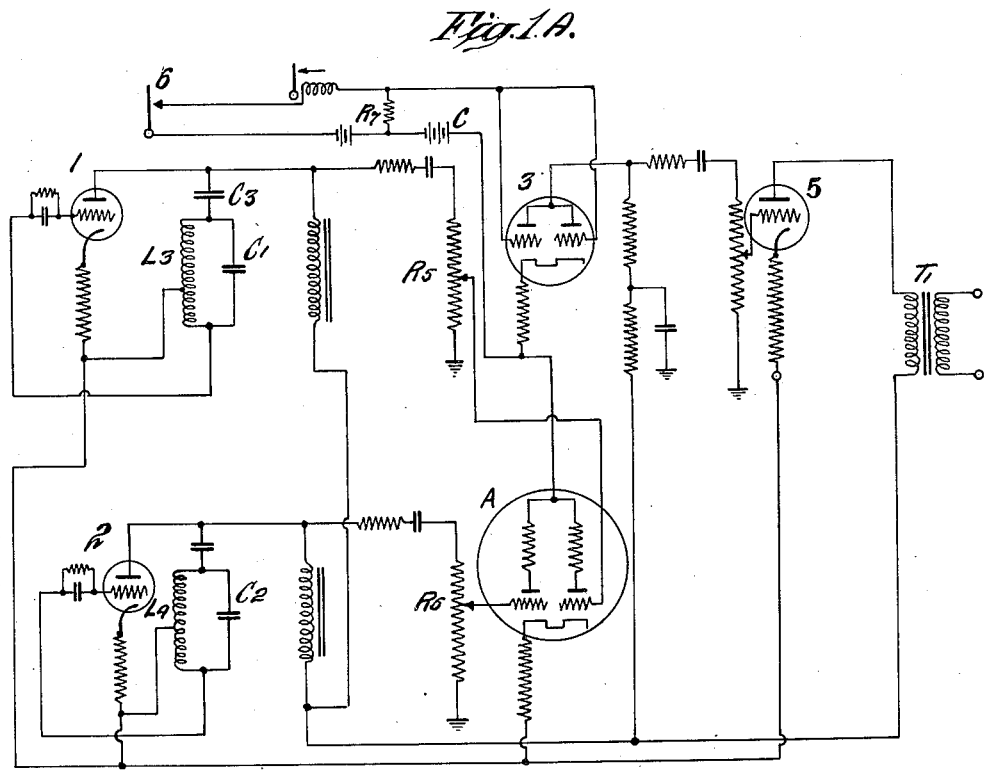
INVENTOR.
ALFRED R. STARR
BY
ATTORNEY March 14, 1950  A. R. STARR  2,500,212
RADIO CONTROL SYSTEM
Filed Dec. 18, 1944  3 Sheets-Sheet 2
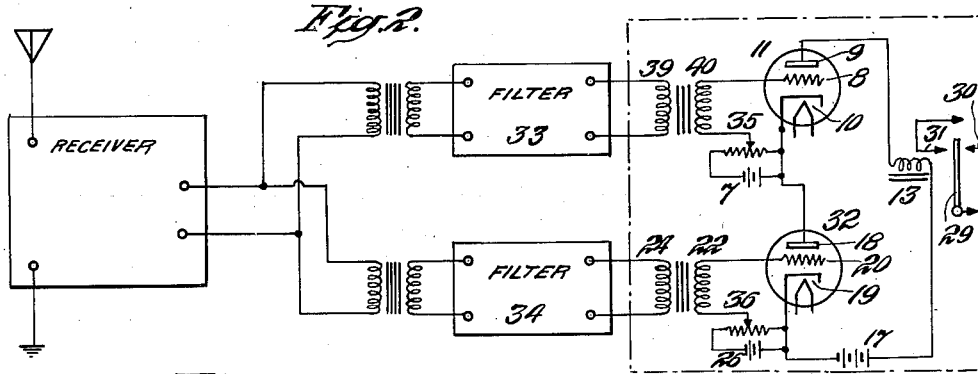
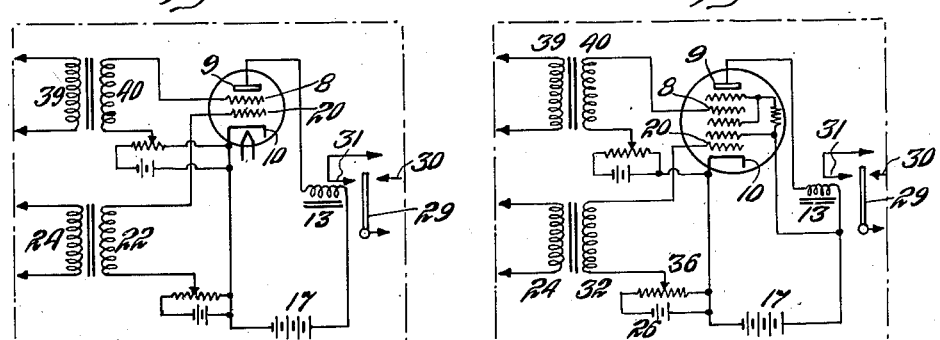
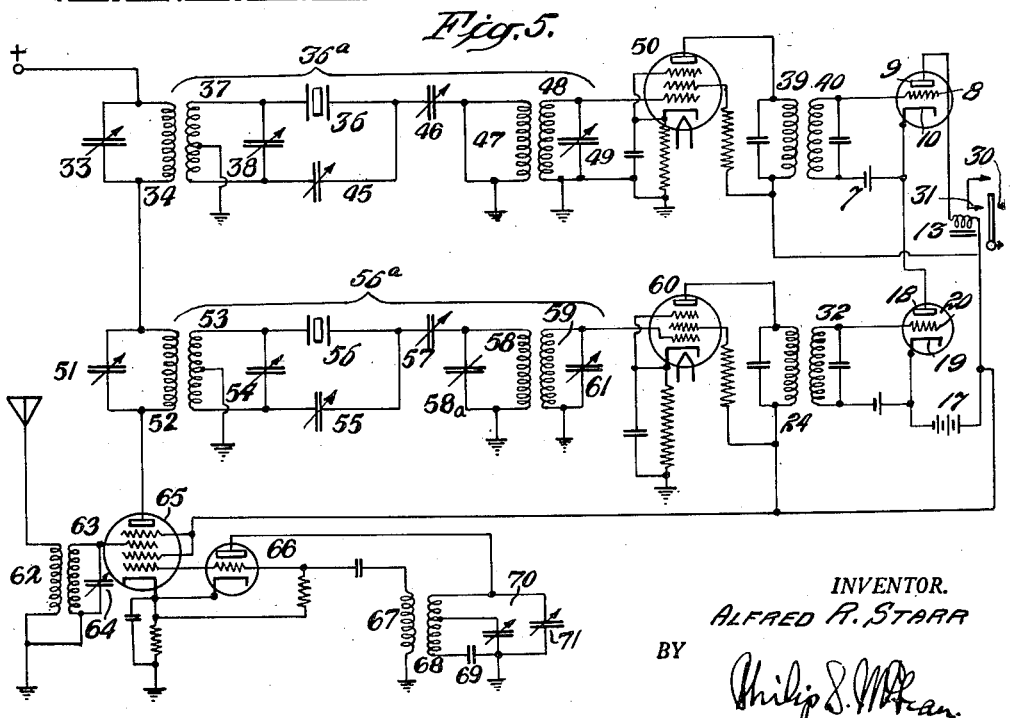
INVENTOR.
ALFRED R. STARR
BY
ATTORNEY

INVENTOR.
ALFRED R. STARR
BY
ATTORNEY

Patented Mar. 14, 1950

2,500,212

UNITED STATES PATENT OFFICE 2,500,212

RADIO CONTROL SYSTEM

Alfred R. Starr, New York, N. Y.

Application December 18, 1944, Serial No. 568,719

16 Claims. (Cl. 250—2)

The invention herein disclosed relates to radio communication control systems, more particularly for remote control or operation of stationary or mobile mechanism such as submarine torpedoes, boats, airplanes, aerial torpedoes, submarine or land mines and the like.

In the remote control and operation of mechanisms by means of electro-radiant or radio energy, it is necessary to provide means to selectively receive the desired impulses and it is further essential that the receiving system be arranged to reject or be non-responsive to all impulses except those intended for its operation. Such receivers have hitherto been complicated, delicate in adjustment and difficult to maintain in positive operative condition.

Important objects of the present invention are to provide a transmitting and receiving system in which selectivity and prevention of interference is attained by means of extremely simple and positively operative mechanism which through its novel features will require a minimum of adjustment and maintenance in operation.

Special objects of the invention are to enable the control of aerial torpedoes and the like by reflected rays such as conventionally employed in radar equipment.

Other objects of the invention are to provide a radio control system in which interference from undesired stations or static will be prevented, entirely eliminated or substantially reduced.

A further special object of the invention is to accomplish differentiation between reflected rays coming from objects at varying distances and to select an object at a predetermined distance as a target and to follow up this selected target as the distance between projectile and target varies.

The foregoing and other desirable objects are attained by the novel features of invention herein disclosed and claimed, and particularly through utilization in a novel manner of a plurality of thermionic tubes having plate circuits connected in series relation and with the input circuits tuned to different frequencies and biased to normally prevent current flow in the output circuits.

The drawings accompanying and forming part of the specification illustrate certain present embodiments of the invention, but modification and changes may be made without departure from the true spirit and broad scope of the invention as hereinafter defined and claimed.

Fig. 1 in the drawing is a diagram of a standard radio transmitter as modulated by two audio frequency oscillators;

Fig. 1A is a diagram of dual frequency oscillators such as employed in Fig. 1;

Fig. 2 is a wiring diagram of the receiving equipment;

Figs. 3 and 4 are diagrams illustrating modified forms of the interlocking circuit, Fig. 3 showing the necessary interlocking effect accomplished by means of a dual grid tube, and Fig. 4 showing the same accomplished by a tube having the characteristic of the 6-A-7 RCA tube;

Fig. 5 is a diagram illustrating the use of crystal filters;

Figure 6:
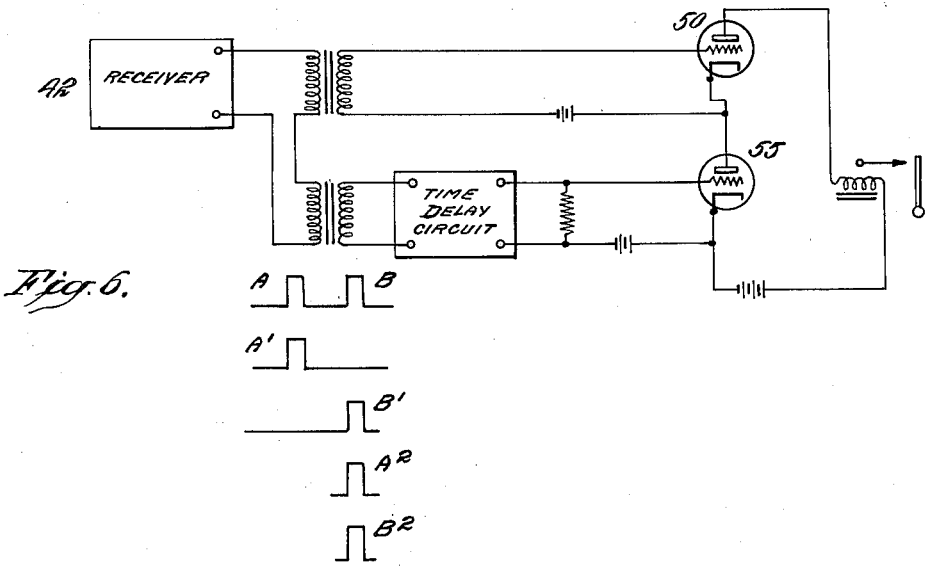
Fig. 6 is a diagram showing the invention embodied in a radar receiver.

As indicated in Fig. 1, a feature of the system is that a single radio frequency carrier wave is modulated by two audio frequencies. For purposes of illustration it may be considered that a chosen radio frequency of 300 meters or one megacycle is employed. This radio frequency carrier is modulated with two audio frequencies of 1000 cycles and 2600 cycles, respectively, all as represented in Fig. 1.

For the grid bias control circuit, in order to switch on and off the two audio frequency oscillators in response to an impulse in a relay circuit, the fundamental circuit disclosed in Canadian Patent No. 246,183 may be employed.

In Fig. 1A, two oscillators, 1 and 2, are shown generating, in this particular example, 1000 and 2600 cycles, respectively. The well known Hartley circuit may be used in which the frequency generated is determined by the inductance $L_3$ and condenser $C_1$. This tuned circuit is coupled to the plate circuit by the blocking condenser $C_3$. Audio frequency energy is transferred from the oscillator by the potentiometer $R_5$ to one grid of the twin tube 4. Also, energy from the oscillator 2 is imposed on the other remaining grid of tube 4 from potentiometer $R_6$. Tubes 4 and 3 are connected with the plate circuits in series relation. Tube 3 is used as a control tube and has a C battery by which the grid is normally biased to the cut-off point.

By adjusting the voltage of the C battery a suitable value of negative potential may be applied to the grid of tube 3 to stop all electronic emission of the cathode of this tube to the plate of the same.

The plate circuits of tubes 3 and 4 being connected in series relation, it follows that if tube 3 is biased with respect to the grid potential, there will normally be no current flow in the output circuits of these tubes or in the common output circuit formed thereby, so that normally any signal impressed on the grids of tube 4 will not be transmitted to the common plate circuit and will be effectively cut off.

On the other hand, if a potential of the proper polarity is impressed across the resistor R7 this will partially neutralize the negative grid bias produced by the C battery. Therefore, making the grid of tube 3 less negative will allow current to flow in the common plate output circuit, and any signal produced by oscillators 1 and 2 will be transferred to the common output circuit of tubes 3 and 4, and in turn to the common amplifier tube 5, and from that to the modulator of the radio transmitter.

It will thus be seen that the two audio frequencies, in this case 1000 and 2600 cycles, respectively, are produced and the relative value of each controlled and the two are mixed in the twin tube 4. These frequencies are controlled by the potential across the resistor R7.

Therefore, when the relay contacts 6 are closed the two frequencies will be transmitted by the radio transmitter T.

The modulated radio frequency wave may be received by a standard radio receiver, Fig. 2, in the usual manner and which will then deliver at its output terminals substantially the same two frequencies which entered the modulation transformer T1 at the transmitter. These two frequencies are separated by the filters 33 and 34, Fig. 2, the 1000 cycle component passing through filter 33 and into the primary 39 of the audio input transformer, and the 2600 cycle component passing through filter 34 and into primary 24 of audio input transformer.

These two frequencies are passed on into the thermionic tubes 11 and 32, Fig. 2, which are connected in such a way that the relay 13 will not operate until and unless both frequencies are present.

The interlocking circuit represented within the dotted lines in Fig. 2 comprises the tubes 11 and 32, the first provided with a grid 8 and cathode 10 with input circuit made up of the secondary of audio transformer 40 connected between the grid 8 and cathode 10 through a C battery 7 with potentiometer 35 to vary the voltage.

Similarly the grid 20 of tube 32 is connected with the secondary 22 of the second audio transformer, through a variable voltage C battery 26.

The plate 9 of tube 11 is connected to a relay 13 while the cathode 10 of this tube is connected to the plate 18 of tube 32. The cathode 19 of tube 32 is connected to the negative terminal of the B battery 17, the positive terminal of the latter being connected to the other side of relay 13. This relay has a movable armature 29 operable between contact points 30, 31.

By adjusting the voltage of the C battery 7 by means of potentiometer 35, a suitable value of negative potential may be applied to the grid 8 to stop all electronic emission of the cathode to the plate of that tube. Similarly, by adjustment of potentiometer 36, the value of negative potential applied by C battery 26 to the grid 20 may be regulated to likewise normally prevent electronic emission from the cathode 19 to the plate 18 of tube 32.

The plate circuits of tubes 11 and 32 are connected in series relation and therefore if these tubes are biased with respect to the grid potential there will normally be no current flow in the output circuits of the tubes or in the common output circuits formed thereby. Thus normally the relay or other receiving device will be non-operative. On the other hand, however, if a signal is received at transformer 39, 40, the impedance of tube 11 will be lowered and current will tend to flow in the output circuit of this tube, but no current will flow in the output circuit of tube 32 unless the input of that tube is similarly receiving an impulse.

It will therefore be seen that the input circuit of tube 11 and the input circuit of tube 32 must each receive an impulse through its respective filter and that unless these impulses are received simultaneously, no current will appear in the output circuit.

Therefore, unless the radio frequency carrier is modulated with audio frequencies corresponding to the band pass frequencies of the two filters, no signal will appear in the output circuit.

Figs. 3 and 4, as before indicated, illustrate modified forms of interlocking circuits which can be substituted in place of that within the dotted line border in Fig. 2, these differing from Fig. 2 principally in that in Fig. 3 a single dual grid tube is employed and in Fig. 4 a 6-A-7 type of tube is employed in place of the two tubes first shown.

Fig. 5 illustrates a form of interlocking circuit employing the superheterodyne principle, having two intermediate frequency channels tuned to different frequencies.

The I. F. amplifier 36a is equipped with a crystal filter 36 which effects extremely sharp filtering.

In the example under consideration, with the R. F. carrier frequency at one megacycle (one million cycles) and modulated with a dual oscillator having frequencies of 1000 cycles and 2600 cycles, there will be generated sidebands of 1,000,000 cycles ±1000 cycles and 1,000,000 cycles ±2600 cycles.

The sidebands will have the following frequencies:

1,002,600 cycles
1,001,000 cycles
999,000 cycles
997,400 cycles

The I. F. amplifier 36a will be tuned to 1,002,600 cycles and the filter 56a to 1,001,000 cycles The remainder of this circuit is substantially the same and operates in the same manner as the interlocking circuits shown in Figs. 2, 3 and 4. These three interlocking circuits may, in fact, be used interchangeably.

It is a feature of all these interlocking circuits that they will not function unless both sideband frequencies are received.

In other respects the results obtained in Fig. 5, using the two I. F. channels, will be the same as those effected in Fig. 2, using a standard receiver and two band pass filters.

One advantage of the Fig. 5 construction is the possible reduction in size with the two I. F. amplifiers 36a and 56a, which are tuned by means of the crystal filters 36 and 56, respectively.

In Fig. 5 a conventional superheterodyne circuit is shown, consisting of a converter tube 65 and a local oscillator tube 66.

The novelty here resides in the use of the two I. F. crystal filters the outputs of which are fed into any one of the three interlocking circuits shown in Figs. 2, 3 and 4. The crystal filters 36a and 56a may be conventional circuits. Many different arrangements are possible but the circuit in 36a and 56a will serve for the purpose of illustration.

The signal enters the primary 62 of the antenna tuning coil and is selected by the tuned circuit consisting of the secondary 63 and variable capacitor 64, from which it enters the grid of the converter tube 65.

The local oscillator 66, the frequency of which is determined by the oscillator transformer 67, 68, and capacitors 69, 70 and 71, feeds into the remaining grid of the converter tube and in doing so produces two intermediate frequencies, which consist of the different frequencies of the combination of the R. F. input side bands and the local oscillator frequency.

The crystal filter 56a is inserted in a circuit having a selective input circuit of variable impedance consisting of a primary and secondary I. F. transformer, the primary being tuned by the variable capacitor 51 and the secondary by the variable capacitor 54. The center tap of the secondary 53 is connected to ground. A phasing capacitor 55 is connected from the balanced secondary input circuit to the right hand terminal of the crystal 56. A coupling capacitor 57 connects the crystal to the output circuit consisting of the primary 58 of an I. F. transformer tuned by the variable capacitor 58a and a secondary 59 tuned by the variable capacitor 61.

One terminal of the secondary is connected to the grid of the pentode 60 which might be a type 6SK7 or other remote cut-off pentode.

The primary of an I. F. transformer 24 is connected in the plate circuit of the pentode 60. The secondary 32 of the said I. F. transformer connects to one grid 20 of the interlocking circuit.

The purpose of the tuned input circuit and tuned output circuit is to vary the selectivity of the crystal filter. This is one in the following manner:

When the input and output circuits are off resonance and the impedance to the incoming frequency is low (i. e. less than the resonant impedance of the crystal), the crystal will have its greatest selectivity. When the impedance of the input and output is equal to or greater than the series resonant impedance of the crystal, the selectivity will be less and a broader band will be passed.

The purpose of the phasing capacitor 55 is to neutralize the capacity of the crystal holder. This is done by passing an out of phase current from the balanced input circuit to the output side of the crystal.

The crystal filter 36a may be identical with filter 56a, so the above description may apply equally to filter 36a.

Fig. 6 represents diagrammatically incorporation of the invention in a radar receiver and the effects produced thereby.

A time delay circuit, so identified, is interposed in the input circuit of tube 55 to bring the reflected pulse into step with the transmitted pulse.

In the diagram A represents the transmitted pulse and B the reflected pulse at the receiver. The time delay may be of the order of 50 microseconds, to bring the reflected pulse into step with the transmitted pulse. A and B show the pulses as actually transmitted and received, A' and B' as offset and $A_2$ and $B_2$ as rectified or brought into step to actuate the relay or other circuit.

Figure 7:
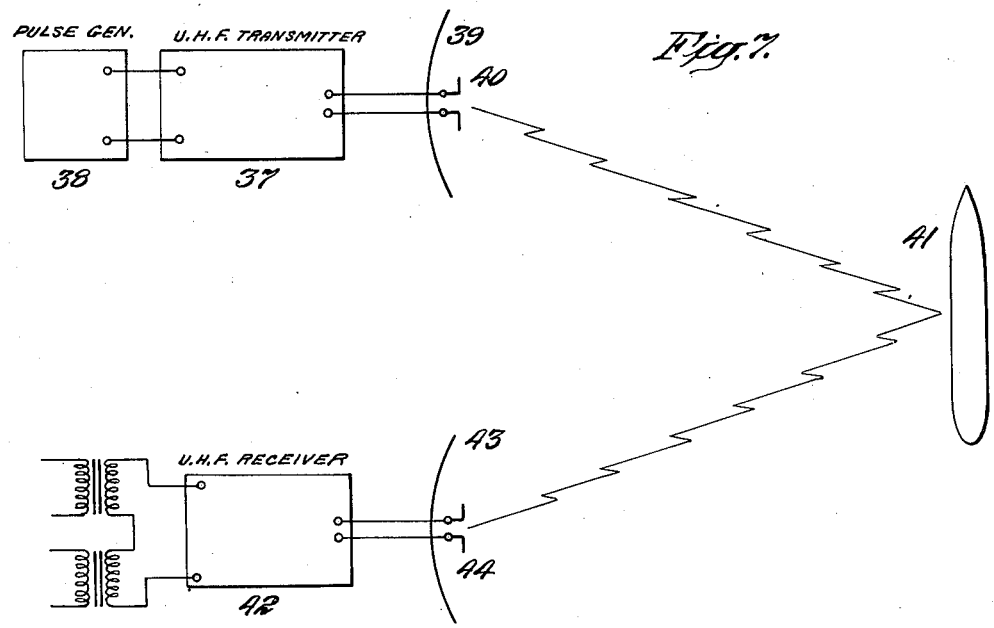
Fig. 7 is a diagram illustrating a complete radar transmitter and receiver embodying the invention.

Referring to Fig. 7, 37 represents a conventional U. H. F. transmitter such as used for radar transmission. Other types may be used for other frequencies. 38 is a pulse generator of conventional design which controls the transmitter. 39 is a parabolic reflector and 40 a dipole arranged to transmit an approximately parallel ray to the object 41 to be detected, which latter might be a robot bomb, enemy airplane or the like. 42 is a U. H. F. receiver such as shown in Fig. 6, equipped with parabolic reflector 43 and dipole antenna 44 for the reflected ray.

Delay of signals and selection of only those which coincide with received reflected pulses provide a means for rejecting all signals except the desired signals which have been reflected from the desired target.

The transmitted pulse is delayed for a period corresponding to the time required for the pulse to travel to the target and return. On its return the reflected signal goes through one tube of the series plate circuit and the delayed pulse from the transmitter goes through the other tube. When these two signals coincide, the responsive device is actuated.

There is also provided means for controlling and varying the amount of time delay to compensate for the movement of the torpedo as it travels toward its target. This might be a motor with worm gear controlling the valve of a resistor or resistors in the time delay circuit.

The motor could be controlled by signals from the reflected pulses. When these fail to coincide with the delayed transmitted pulse, this failure would start the motor.

In addition, the speed of the motor could be set to change the time delay at a rate corresponding to the speed of the aerial torpedo so that under ordinary circumstances, the delay circuit would be changed correctly as the torpedo approached the target.

A certain amount of tolerance could be allowed before the control would fall out.

If there were a failure, this would automatically speed up the motor by shorting out a series resistor in the motor control circuit.

What is claimed is:

1. In a radio control system, a radio receiver, a plurality of band pass filters connected in the audio output of said receiver, thermionic means having tuned input circuits connected with the outputs of said band pass filters and having output circuits connected in series relation, and means biasing said thermionic means to normally prevent current flow in said output circuits.

2. In a radio control system, means for generating a radio frequency carrier wave, means for modulating said carrier wave with a plurality of audio frequencies, means for selecting and detecting said carrier wave, means for selecting said audio frequency modulations, a plurality of thermionic devices, tuned input circuits for each of said devices, said devices having output circuits connected in series relation, and means whereby current is normally prevented from flowing in the output circuits of each of said devices unless said plurality of audio frequencies are simultaneously present.

3. In a radio control system, means for generating a radio frequency carrier wave, modulated simultaneously with a plurality of audio frequencies, means for reception of said modulated carrier wave, a plurality of thermionic devices separately tuned input filter circuits for each of said devices, output circuits for each of said devices, said output circuits being connected in series to form a common output circuit, and a signal responsive device included in said common circuit and responsive only to the simultaneous presence of said plurality of audio frequencies.

4. In a selective radio receiver, a radio frequency amplifier, a plurality of thermionic devices, tuned audio input circuits for each of said devices, said devices having output circuits connected in series relation, and means biasing said devices severally to normally prevent current flow in said output circuits.

5. In a selective radio reception system, a plurality of thermionic devices, tuned input filter circuits for each of said devices, output circuits for each of said devices, said devices being connected through their output circuits in series relation and means for preventing current from flowing in the output circuits of each of said devices and for permitting current to flow therein in the simultaneous presence of frequencies passed by said tuned input filter circuits.

6. In a selective radio reception system, a plurality of thermionic devices, individually tuned filter input circuits for each of said devices, individual biasing means for the input circuits of each of said devices, output circuits for each of said devices and means connecting said output circuits in series relation and responsive only to simultaneous reception of frequencies passed by said individually tuned filter circuits.

7. In a radio reception system, a plurality of thermionic devices having grids and cathodes, each of said devices being provided with a separately tuned input circuit, an output circuit for each of said devices, said output circuits being connected in series and a "C" battery provided in each of said input circuits, connected with a grid and a cathode of said thermionic devices and adjusted in value to normally prevent current flow in the output circuit of each of said devices and permit current flow in the simultaneous presence of certain different frequencies and a control responsive only to the simultaneous presence of said particular frequencies.

8. In a selective radio reception system, a plurality of thermionic devices, separately tuned input circuits for each of said devices, biasing means for each of the input circuits of said devices, output circuits for each of said devices, said output circuits being connected in series to form a common output circuit, and a signal responsive device included in said common circuit and responsive only to the simultaneous presence of different selected frequencies in said common output circuit.

9. In a radio control system, a radio receiver, a plurality of band pass filters connected in the audio output of said receiver, thermionic means having tuned input circuits connected with the outputs of said band pass filters and having output circuits connected in series relation, means biasing said thermionic means to normally prevent current flow in said output circuits and a control connected with said output circuits and responsive only to simultaneous presence of frequencies passed by said band pass filters.

10. In a radio control system, a radio receiver, a plurality of band pass filters connected in the audio output of said receiver, thermionic means having tuned input circuits connected with the outputs of said band pass filters and having a common output circuit, said input circuits controlling the thermionic emission of said thermionic means and means biasing said thermionic input means to prevent current flow in said common output circuit.

11. In a selective radio reception system, a thermionic device, a plurality of tuned input means controlling said thermionic device, said input means being negatively biased to prevent current flow in said thermionic device under zero signal conditions and a common output circuit responsive only to simultaneous signals in said tuned input means.

12. In a radio reception system, a thermionic device, a plurality of separately turned input circuits connected therewith, a common output circuit from said thermionic device, a relay in said common output circuit, and a "C" battery in each of said input circuits and adjusted in value to normally prevent current flow in the common output cicuit and biased beyond cut-off in order to require a signal of a definite predetermined value before said relay will be operated.

13. In a selective radio reception system, a coincidence circuit comprising a thermionic device, a plurality of tuned input circuits connected therewith, a common thermionic output circuit, said input circuits being negatively biased to normally prevent current flow in said common output circuit, under zero signal conditions.

14. In a selective radio reception system, a superheterodyne oscillator and converter, a plurality of intermediate frequency crystal filters and amplifiers, detecting means for each of said intermediate frequency amplifiers, a plurality of thermionic devices, each of said devices being provided with a separately tuned input circuit, an output circuit for each of said devices, said output circuits being connected in series and a "C" battery provided in each of said input circuits, and adjusted in value to normally prevent current flow in the output circuit of each of said devices.

15. In a selective radio reception system, a thermionic device, a plurality of control grids, separately tuned input circuits for each control grid, a common thermionic output circuit and each control grid being severally biased to normally prevent current flow in the common output circuit.

16. In a selective radio reception system, a thermionic device, dual control grids, separately tuned input circuits for each grid, biasing means for each input circuit, a common output circuit, biasing means to prevent current flow in the common output, and a responsive device included in said common circuit.

ALFRED R. STARR.

REFERENCES CITED

The following references are of record in the file of this patent:

UNITED STATES PATENTS

| Number | Name | Date |
|---|---|---|
| 1,326,727 | Hammond, Jr. | Dec. 30, 1919 |
| 1,514,699 | Hanson | Nov. 11, 1924 |
| 1,984,379 | Mirick | Dec. 18, 1934 |
| 2,165,800 | Koch | July 11, 1939 |
| 2,250,708 | Herz | July 29, 1941 |
| 2,397,088 | Clay | Mar. 26, 1946 |
| 2,411,787 | Hammond | Nov. 26, 1946 |
| 2,413,621 | Hammond, Jr. | Dec. 31, 1946 |
| 2,419,541 | De Rosa | Apr. 29, 1947 |